March 20, 1956     J. R. PARKER     2,738,584

METHOD OF AND APPARATUS FOR DESIGNING INDUSTRIAL PLANT LAYOUT

Filed Nov. 12, 1954     4 Sheets-Sheet 1

INVENTOR
Jack R. Parker
BY Irving Seidman
ATTORNEY

March 20, 1956 J. R. PARKER 2,738,584
METHOD OF AND APPARATUS FOR DESIGNING INDUSTRIAL PLANT LAYOUT
Filed Nov. 12, 1954 4 Sheets-Sheet 2

INVENTOR
Jack R. Parker
BY
Irving Seidman
ATTORNEY

March 20, 1956     J. R. PARKER     2,738,584
METHOD OF AND APPARATUS FOR DESIGNING INDUSTRIAL PLANT LAYOUT
Filed Nov. 12, 1954     4 Sheets-Sheet 3
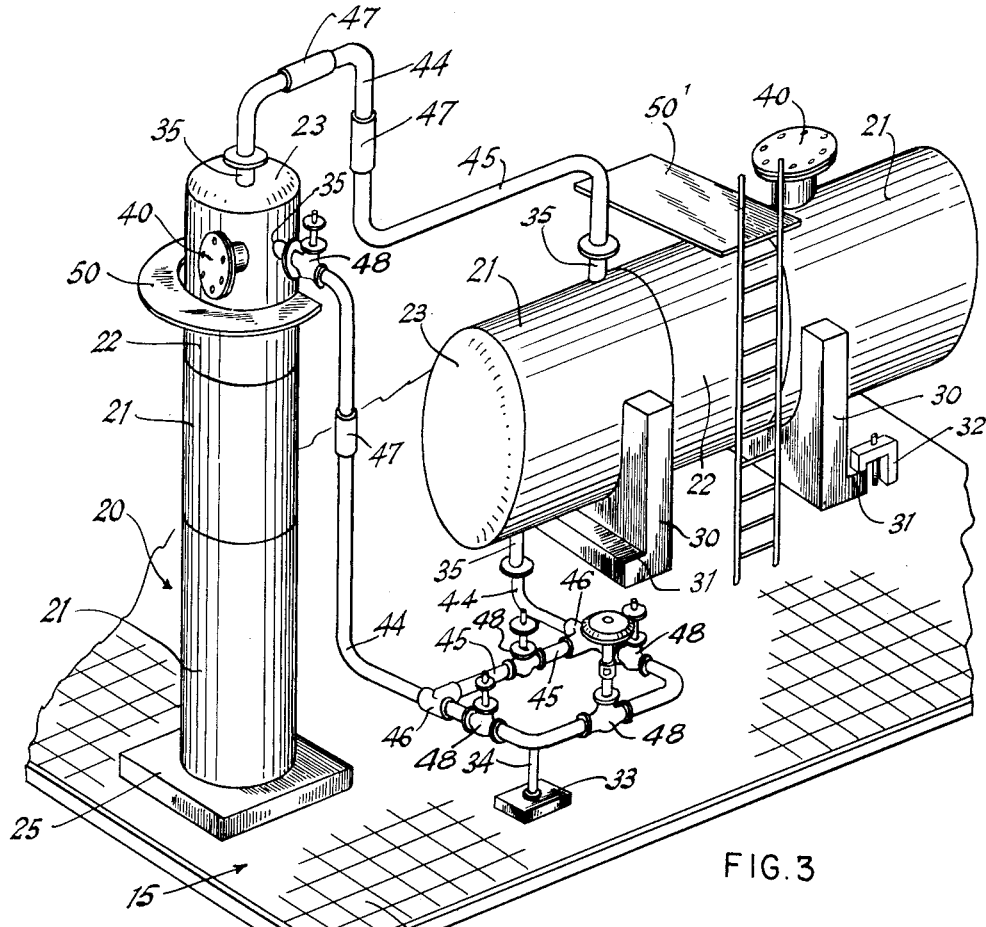
FIG. 3
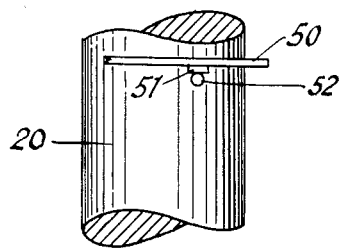
FIG. 6
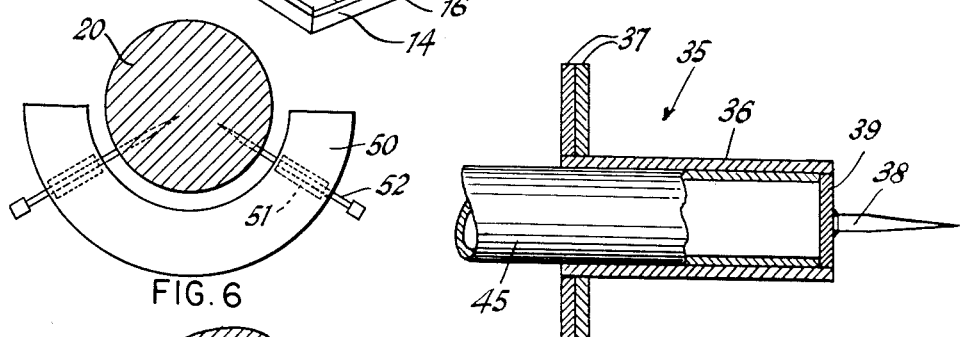
FIG. 4
FIG. 7
INVENTOR
Jack R. Parker
BY
Irving Seidman
ATTORNEY March 20, 1956  J. R. PARKER  2,738,584
METHOD OF AND APPARATUS FOR DESIGNING INDUSTRIAL PLANT LAYOUT
Filed Nov. 12, 1954  4 Sheets-Sheet 4

INVENTOR
Jack R. Parker
BY
Irving Seidman
ATTORNEY

United States Patent Office 2,738,584
Patented Mar. 20, 1956

2,738,584

METHOD OF AND APPARATUS FOR DESIGNING INDUSTRIAL PLANT LAYOUT

Jack R. Parker, Malverne, N. Y.

Application November 12, 1954, Serial No. 468,340

6 Claims. (Cl. 33—1)

This invention relates to a method of and apparatus for designing an industrial plant layout. More particularly, the invention is directed to novel means for constructing a three-dimensional model of such a layout, in which the size and rotation of parts can be readily and easily changed at will, and to a method of providing two-dimensional reproductions of such model for use as dimensioned construction plans.

The customary way of planning and designing an industrial plant layout, such as a chemical plant or a refinery, for example, is to draw scale plans, elevations and sections of each floor on paper. The various items of equipment and their connections, such as fluid lines, piping, wiring, etc. were sketched in tentatively, and then erased or re-drawn as often as necessary to work out their ultimate locations with required clearances and working spaces.

While this procedure is laborious, costly, and time consuming in general, it is particularly so in designing refineries, chemical plants and like apparatus due to the necessity for proper location and orientation of manholes, handholes, valves, etc. for access from working stations.

An improvement on this procedure has been the preparation of scale plans of the various levels or floors and the use of scale plan cutouts or three-dimensional models of the several equipment units. These models are moved around the scale plan drawings until the desired locations and orientations are achieved. The units must then be sketched onto the plan drawings and their connections drawn in. While this has saved some time, it is still costly as accurate scale models of each piece of equipment must be provided for each new layout.

It has also been proposed to photograph such three-dimensional layouts to provide working prints thereof. However, numerous difficulties and complications in successfully applying this latter technique have rendered it impractical for commercial use.

The present invention is directed to a novel means and method for preparing three-dimensional scale layouts of industrial plants and effectively using these lay-outs to prepare the actual working or erection prints. To this end, the invention means includes a metal plate which is scribed with perpendicularly related longitudinal and lateral lines forming a grid of squares corresponding to the scale of the three-dimensional model. Each of the units or items of equipment to be mounted on the plate has a magnetized base or foundation so that, when positioned on the plate, it will remain in place.

Each vessel or tank is made up of interengageable sections including heads and intermediate filler pieces. The filler pieces are supplied in uniform scale lengths for each diameter of vessel so that, by using the filler pieces, the vessel may be built up to any desired length in increments of one foot, and the dished heads added. The same vessel elements can be used for either vertically or horizontally arranged vessels. The filler pieces are of a soft material, such as a soft wood, so that attachments may be readily secured to the vessel by pressing points or nails into the wood.

Prefabricated manholes, handholes, valves, and nozzles are supplied in scale for all standard sizes, and provided with sharp points for mounting on the vessel. The outer ends of the nozzles are recessed to receive piping.

With the handholes, manholes, valves and nozzles properly positioned on each vessel, the working platforms can be installed on each vessel at the proper location for working the valves and for access to the handholes and manholes. These platforms are pre-cut to scale in the several contours (round, half-round, square, etc.) required. To install the platforms, several nails are pushed into the vessels at the desired platform location. A magnetized strip on the undersurface of the platform engages the nails to hold the platform in position. The platforms can thus be readily re-located as desired.

The piping used is plastic extrusions, either solid or tubular, in all scale diameters including covering insulation. Connections, such as T's, bends, elbows, loops, etc. are cast or prefabricated from such tubing, and joints are formed by tubular collars receiving the ends of the piping or its connections. The plastic "pipe" can be easily cut or sawed to appropriate lengths, and can be appropriately colored for identification. The scale valves may be of metal or plastic and arranged for "snap-on" connection to the piping at any desired location.

Structural shapes and members are prefabricated to scale of metal or plastic, and joined by dowelled connection pieces to form supports for overhead piping. These shapes and members are provided with magnetized bases for ready adherence to the scaled foundation plate. The foundation pieces for the structural members, as well as the saddles and supports for the vessels, are formed with a projecting lip for clamping to the scaled metal plate for shipment of the model to the field.

As a feature of the invention, a novel gauge is provided for marking each vessel for attachment of manholes, handholes, valves, nozzles, etc. This gauge comprises a circular base having its periphery graduated in degrees. At the center of the base is a circular positioner having a central dowel arranged to engage the vessel to be marked. A radially extending scale arm is arranged to swing about the center of the base in a horizontal plane, and contains radially spaced recesses for a vertical scale arm. This scale arm has a scriber movable therealong including a pointed marker movable radially inwardly and outwardly.

To mark a vessel, the vessel is placed on the positioner and held against rotation by an eccentric pin. The scale arm is then swung to the proper angular position for the desired marking and the scriber moved to the desired height. The pointed marker is then pushed inwardly to mark the location on the vessel.

After all the parts have been finally positioned in place, and all the piping and connections made in the desired correlation, the model is ready for use in making the construction prints. To do this, a camera is mounted at a fixed distance above the model and a series of horizontal or plan photographs are made at uniformly spaced positions both longitudinally and laterally of the model. The photographs are thus taken at the intersections of a uniform grid. Each photograph will include a small portion substantially at its center in which the "perspective" effect will be non-existent or negligible, and in which there will be no observable shadows of parts above the base plane. These small equal sized squares are then cut from the several photographs and reassembled on a flat base to form a composite photograph. This composite photograph is then rephotographed to provide the working prints for erecting the plant.

Working elevation prints of the model are formed in the same way by photographing the elevations of the model at the intersections of a uniform vertical grid spaced from the model, cutting out the center of each picture, and reassembling the cut out centers to form a composite elevation print. Horizontal and vertical sections of the model can be provided by disconnecting the parts of the model along the desired section plane and photographing the remainder of the model in the described manner.

For an understanding of the invention principles, reference is made to the following description of a typical embodiment thereof as illustrated in the accompanying drawing. In the drawing:

Fig. 3 is a perspective view of a portion of a three-dimensional model incorporating the plate of Fig. 1, the vessel of Fig. 2, and associated elements;

Fig. 4 is an axial sectional view through a removable scale nozzle;

Fig. 6 is a plan view of a scale platform mounted on a vessel;

Fig. 7 is an elevation view of the platform;

Figure 1:
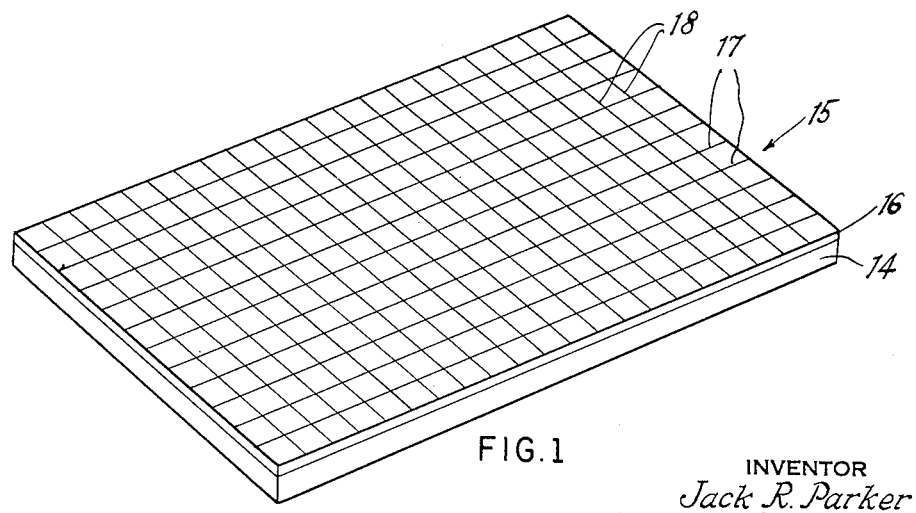
Fig. 1 is a perspective view of the grid inscribed mounting plate.

Referring to Fig. 1, the mounting plate 15 comprises a flat base 14 of plywood or the like, to the upper surface of which is secured a sheet of metal 16. Metal sheet 16 has inscribed thereon a regular grid to the desired scale of the three-dimensional model. This grid comprises uniformly spaced and parallel longitudinal lines 17 and lateral lines 18 intersecting at right angles.

Mounting plate 15 forms the support for the model, and for this purpose, all the elements directly engaging the plate 15 are formed with magnetized bases so that, when placed on plate 15 they will remain in position. The grid 17—18 provides for accurate relative positioning of the various units at proper horizontal spacing and, in addition, provides a scale useful in the ultimate working prints.

Figure 2:
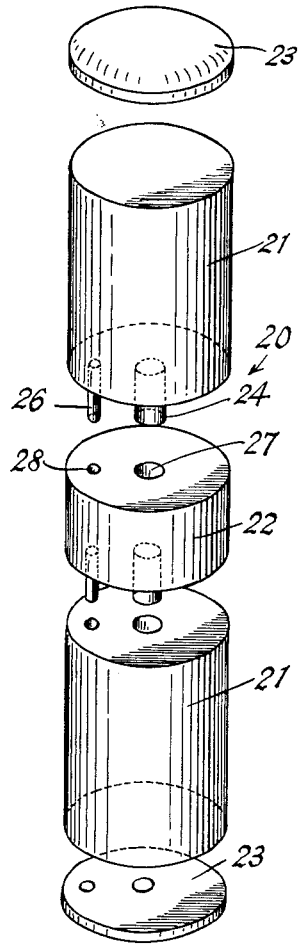
Fig. 2 is an exploded view of a vessel.

While the invention is applicable to the design of any industrial plant, it is particularly useful in designing refineries and chemical plants. Referring to Figs. 2 and 3, the vessels 20 used in the scale model comprise an assembly of scale vessels 21, filler pieces 22, and dished heads 23, when the latter are required. All of these pieces are formed of a soft or easily penetrable material such as soft wood.

The scale vessels 21 are provided in all standard lengths and standard diameters, the lengths differing by one scale foot, for example. The filler pieces 22 are provided in standard diameters and one foot lengths, so that a vessel 20 of a given diameter can be made any length desired by using the proper number of pieces 21 and pieces 22. One end of each piece 21 or 22 is provided with a central dowel 24 and an eccentric dowel 26. These fit, respectively, in a central hole 27 and an eccentric hole 28 of the next adjacent piece. When the proper number of pieces 21, 22 are assembled to form the required length of vessel, the dished heads 23, turned from soft wood or the like, may be secured on either or both ends.

The assembled vessels 20 may be used either as horizontal vessels or as vertical vessels. When used as a vertical vessel, the bottom member 21 or 22 is interfitted with a magnetized metal foundation or base 25 by means of which it may be held in position on plate 15.

When vessels 20 are arranged horizontally, they are supported in scaled saddles 30 of magnetized metal for positioning on plate 15. Saddles 30 have slightly projecting lips 31 for application of toolmakers' clamps 32 to hold the parts assembled during shipment of the finished model to the field. Clamps 32 can be readily applied to base 25 and to magnetized metal base 33 of piping supports 34, being held in place by screws threaded into either base. However, clamps 32 are used only for shipping the model, and the magnetized metal elements 25, 30 and 33 provide adherence between the units and plate 15 while allowing ready shifting of the units during trial of piping layouts.

Fig. 4 illustrates a typical scale nozzle 35 as comprising a piece of tubing 36 on which are mounted "flanges" 37 in the form of rubber grommets. The nozzle mounting means comprises a sharp nail 38 welded to a circular backing plate 39 inserted in tubing 36. With this arrangement, the nozzles 35 can be quickly mounted on vessels 20 at any location determined by the internal design of the vessels.

Figure 5:
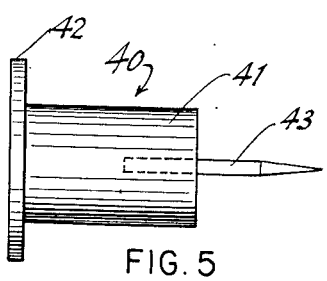
Fig. 5 is a similar view of a scale manhole or handhole.

Manholes and handholes 40 are constructed somewhat similarly to nozzles 35, as can be seen from Fig. 5. Each manhole or handhole comprises a solid cylindrical piece 41 on the outer end of which is mounted an annular rubber flange 42. A sharp nail 43 projects from the inner end of piece 41 for readily mounting element 40 at any desired location on vessels 20.

The "piping" 45 is formed of extruded cylindrical plastic, either tubular or solid, and is provided in all scale diameters, including covering insulation, to simulate actual scale conditions. The extruded plastic "piping" can be easily cut to any length desired. Bends and elbows 44 and T's 46 are pre-fabricated to the desired scale size and joined to piping 45 by insertion into coupling sleeves 47. Sleeves 47 are also used to join cut lengths of piping 45, and the latter is joined to vessels 20 by insertion into nozzles 35. Valves 48 are formed to scale, of metal or plastic, and are of the "snap-on" type so that they can be readily positioned at any location on the piping. For example, valves 48 may have facing spring extensions arranged to spread and snap over a pipe and resiliently grip the latter.

After the nozzles, manholes, handholes and valves are positioned in place, the working platforms 50 and 50' can be positioned on the vessels 20 at the proper scale location for ready access of a workman to these elements. These platforms are pre-cut in shapes of round, half-round, square, rectangular, etc., and to scale. The undersurface of each platform has secured thereto one or more pieces 51 of magnetized metal. As best seen in Figs. 6 and 7, the platforms are mounted on vessels 20 by pushing one or more nails 52 into the vessel at the desired locations. The magnetized pieces 51 adhere to nails 52 holding the platforms in place. The platforms can be quickly re-located by withdrawing nails 51 and inserting them into vessels 20 at the new location.

Figure 9:
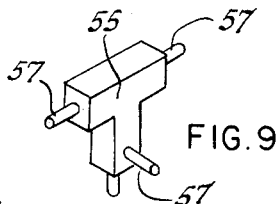
Fig. 9 is a perspective view of a connector for elements of the supporting structure.
Figure 8:
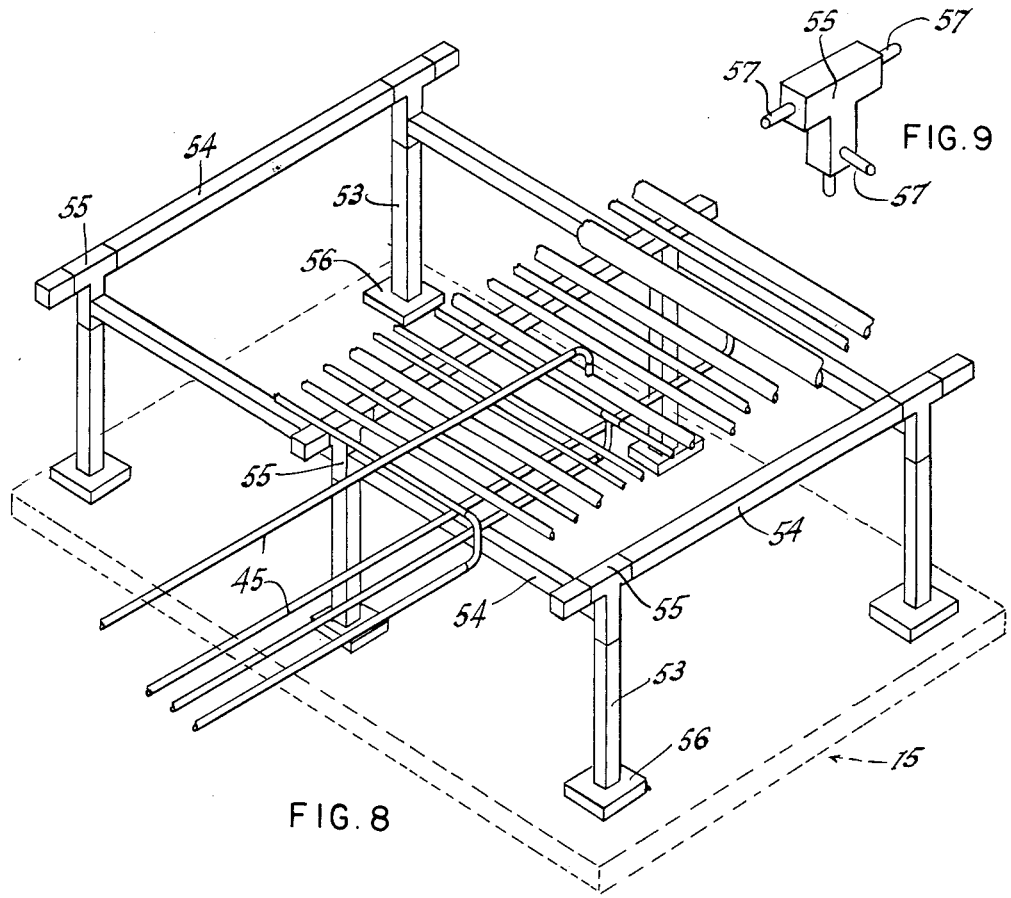
Fig. 8 is a perspective view of a three-dimensional scale model of a supporting structure for overhead piping.

To simulate the supports for overhead piping in yards, etc., standard structural shapes are pre-fabricated to scale in various lengths. Referring to Figs. 8 and 9, structural uprights 53 and horizontals 54 are assembled by means of connectors 55, with the uprights 53 having bases 56 of magnetized metal for mounting the framework on plate 15. Connectors 55 may have dowels 57 insertable into holes in the ends of members 53, 54.

Figure 10:
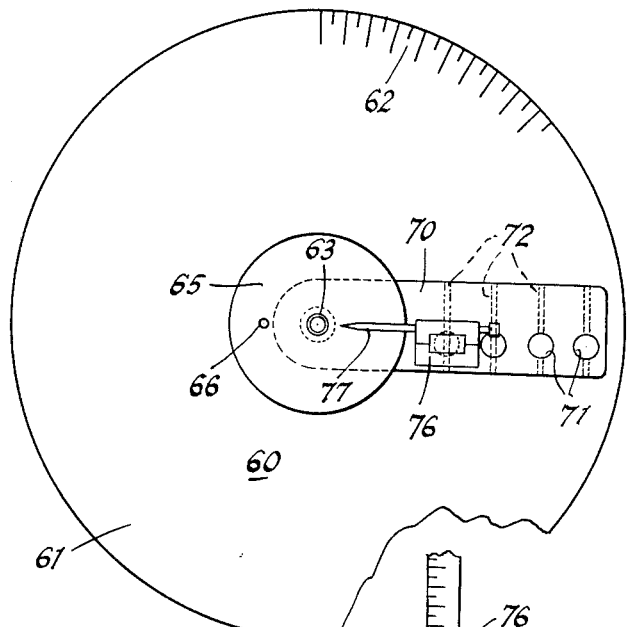
Fig. 10 is a plan view of the vessel marking gauge.
Figure 11:
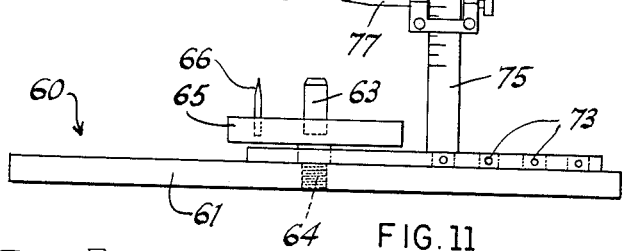
Fig. 11 is an elevation view of the gauge.
Figure 12:
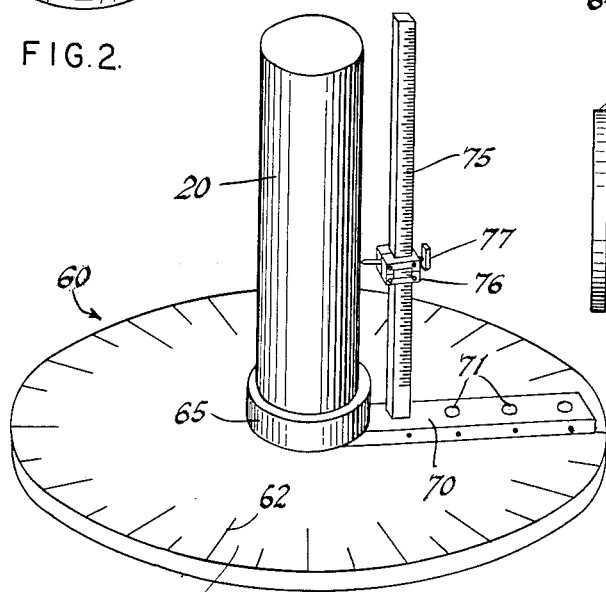
Fig. 12 is a perspective view illustrating use of the gauge in marking a vessel.

Figs. 10 through 12 illustrate the gauge for marking accessory locations on vessels 20. This gauge 60 includes a circular base 61 having its periphery graduated in degrees, as at 62. A circular positioner 65 is provided with a stud 64 projecting from its lower surface and threaded at its end for securement in a central threaded hole in base 61. A stud 63 projects centrally from the upper surface of positioner 65 and a pin 66 projects eccentrically upwardly from the positioner. Elements 63, 66 non-rotatably secure a vessel 20 on positioner 65.

A radius arm 70 is mounted to swing on stud 64, and has radially spaced holes 71 to receive the reduced end of a vertical scale 75. Transverse passages 72 intersect holes 71 to receive pins 73 which secure scale 75 in a hole 71 selected in accordance with the diameter of vessel 20. A scriber support 76 is movable along scale 75 and carries a radially movable marking pointer or scriber 77.

To mark a vessel 20, it is placed on positioner 65, being held against rotation by pin 66. Assuming that it is desired to locate a nozzle 35 at ten feet above grade and thirty degrees from the centerline, arm 70 is swung to the 30° marking on scale 62 and support 76 is moved up on scale 75 to the 10' position. Scriber 77 is then pressed lightly inwardly to mark the nozzle location, and vessel 20, after all locations are marked, is removed from positioner 65.

Figure 13:
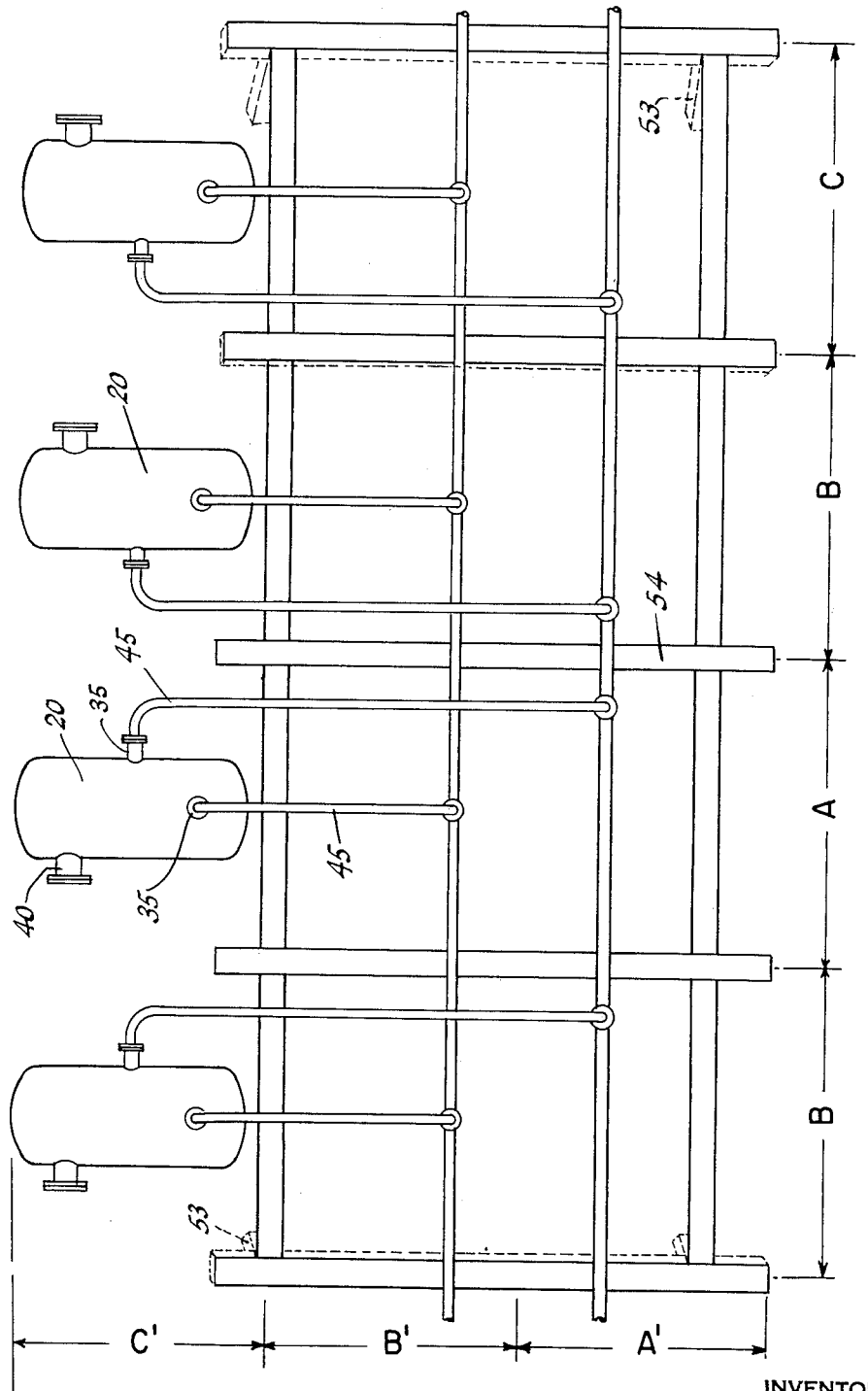
Fig. 13 is a plan view of the model illustrating the technique used in photographing the model to provide working prints.

After all the elements of the model are in final position, a novel photographic technique is used to provide scale working prints of the plant. Referring to Fig. 13, a camera is mounted at a fixed distance above the model to "shoot" downwardly to provide a "horizontal plan" picture. The camera is then moved successively to different locations in a horizontal plane, each position being an intersection of a uniform grid of perpendicularly related horizontal, parallel, uniformly spaced grid lines. At each location, a picture is taken.

Assuming that a "shot" is taken with the camera centered over the area having the longitudinal extent "A" and the lateral extent A', the picture will appear as diagrammatically illustrated in Fig. 13. Due to the "perspective" or "parallax" effect, provided by the light rays converging through the camera lens, only the area A x A' will appear as a true plan. The areas A x B' and A' x B will have a slight "perspective" appearance, and the areas A' x C and B' x C will have a very pronounced "perspective" appearance.

From the print of this "shot" (centered on A x A') the area A x A' is cut out. Similar shots are then taken on A' x B, A' x C, B' x B, etc., and from each print the central area is cut out and the remainder discarded. Utilizing the grid markings 17—18, the retained central cutouts are trimmed and reassembled to form a composite print in which the entire print appears as a "horizontal" plan view. This composite print is then marked with dimension lines and reproduced to provide the working "horizontal plan view" prints.

The same technique is employed in making the working "elevation view" prints. To make a horizontal or vertical sectional view, the model is disconnected along the "section line" and the "section" photographed using the technique just described. Such disconnection is readily effected by virtue of the magnetic "adherence" of the units to plate 15 and the other features facilitating ready disassembly and re-assembly of parts.

The invention eliminates the making of initial plans and several costly "work-ups" of the layout, and the resultant model can be used for planning, production design, checking, stress analysis, field erection, and training of operating personnel. Fifty per cent, or more, of the usual manhours required for these procedures can be saved by using the present invention.

While a specific embodiment of the invention has been shown and described in detail to illustrate the application of the invention principles, it will be understood that the invention may be embodied otherwise without departing from such principles.

What is claimed is:

1. The method of utilizing a three-dimensional scale model of an industrial plant to provide working prints for erecting the plant, comprising the steps of erecting said model on a foundation plate having on its surface a scaled grid of uniformly spaced longitudinal and lateral lines extending perpendicularly to each other; taking a plurality of photographic pictures of said model with the camera remaining in a fixed plane in spaced parallel relation to the desired plane of the working prints, each picture being taken at a different intersection of a scaled grid of uniformly spaced longitudinal and lateral lines extending perpendicularly to each other in said fixed plane; cutting from each picture a rectangular portion centered on the lens axis of the camera and of a lateral extent such that "perspective" effects are not apparent in such portion of the print; utilizing the scaled grid of said foundation plate to assemble such cutout print portions to form a mosaic print; and reproducing such mosaic print to provide the desired working print.

2. The method of utilizing a three-dimensional scale model of an industrial plant to provide working prints for erecting the plant, comprising the steps of erecting said model on a foundation plate having on its surface a scaled grid of uniformly spaced longitudinal and lateral lines extending perpendicularly to each other; taking a plurality of photographic pictures of said model with the camera remaining in a fixed plane in spaced parallel relation to the desired plane of the working prints, each picture being taken at a different intersection of a scaled grid of uniformly spaced longitudinal and lateral lines extending perpendicularly to each other in said fixed plane; cutting from each picture a rectangular portion centered on the lens axis of the camera and of a lateral extent such that "perspective" effects are not apparent in such portion of the print; utilizing the scaled grid of said foundation plate to assemble such cutout print portions to form a mosaic print; applying dimensions to such mosaic print; and reproducing such mosaic print to provide the desired working print.

3. For use in a three-dimensional scale model of an industrial plant including vessels interconnected by piping, a scale model vessel comprising a cylinder of penetrable material, and a nozzle simulating attachment therefor including a tubular member, rubber annulus means on the outer end of said tubular member simulating a flange, and a sharp point projecting from the inner end of said member for penetrating attachment to said cylinder.

4. For use in a three-dimensional scale model of an industrial plant including vessels interconnected by piping, a scale model vessel comprising a cylinder of penetrable materials; and an access hole simulating attachment therefor including a cylindrical member, rubber annulus means on the outer end of said tubular member simulating a flange, and a sharp point projecting from the inner end of said member for penetrating attachment to said cylinder.

5. For use in a three-dimensional scale model of an industrial plant including vessels interconnected by piping, a scale model vessel comprising a cylinder of penetrable material; a nozzle simulating attachment therefor including a tubular member, rubber annulus means on the outer end of said tubular member simulating a flange, and a sharp point projecting from the inner end of said member for penetrating attachment to said cylinder; simulated piping elements of extruded cylindrical material insertable in said tubular member; pipe couplings comprising sleeves receiving ends of adjacent piping elements; and scale model valves arranged for disengageable connection to said piping elements.

6. For use in a three-dimensional scale model of an industrial plant including vessels interconnected by piping, a scale model vessel comprising a cylinder of penetrable material; and a simulated working platform therefor including a scaled, contoured platform plate, nails insertable in said cylinder at the platform location and magnetized metal means on the under surface of said plate cooperable with said nails.

(References on following page)

References Cited in the file of this patent

UNITED STATES PATENTS

| | | |
|---|---|---|
| 311,793 | Stranders | Feb. 3, 1885 |
| 1,016,571 | Lewis | Feb. 6, 1912 |
| 1,329,850 | Pye | Feb. 3, 1920 |
| 1,519,965 | Hovhannessian | Dec. 16, 1924 |
| 2,254,498 | Scharf | Sept. 2, 1941 |
| 2,259,611 | Burger | Oct. 21, 1941 |
| 2,284,458 | Van Antwerp | May 26, 1942 |
| 2,376,601 | Kiesel | May 22, 1945 |
| 2,429,923 | Cavicchi | Oct. 28, 1947 |
| 2,464,793 | Cooke | Mar. 22, 1949 |
| 2,523,508 | Ledgett | Sept. 26, 1950 |
| 2,600,261 | Pennington | June 10, 1952 |
| 2,610,413 | Dasey | Sept. 16, 1952 |
| 2,668,370 | Trimble | Feb. 9, 1954 |
| 2,676,420 | Berg | Apr. 27, 1954 |

FOREIGN PATENTS

| | | |
|---|---|---|
| 649,530 | France | Sept. 3, 1928 |